(12) United States Patent
Lai et al.

(10) Patent No.: US 12,022,386 B2
(45) Date of Patent: *Jun. 25, 2024

(54) NETWORK SELECTION FOR SUPPORTED STANDALONE NON-PUBLIC NETWORK (S-SNPN)

(71) Applicant: MEDIATEK INC., Hsinchu (TW)

(72) Inventors: Chia-Lin Lai, Hsinchu (TW); Chien-Chun Huang-Fu, Hsinchu (TW); Yuan-Chieh Lin, Hsinchu (TW); Guillaume Sebire, Oulu (FI)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,296

(22) Filed: Apr. 18, 2023

(65) Prior Publication Data

US 2023/0254767 A1    Aug. 10, 2023

Related U.S. Application Data

(63) Continuation of application No. 17/365,018, filed on Jul. 1, 2021, now Pat. No. 11,683,749.

(Continued)

(51) Int. Cl.
*H04W 48/18* (2009.01)
*H04W 48/16* (2009.01)
*H04W 84/04* (2009.01)

(52) U.S. Cl.
CPC ........... *H04W 48/18* (2013.01); *H04W 48/16* (2013.01); *H04W 84/042* (2013.01)

(58) Field of Classification Search
CPC .... H04W 48/18; H04W 48/16; H04W 84/042
See application file for complete search history.

(56) References Cited

U.S. PATENT DOCUMENTS 11,683,749 B2 * 6/2023 Lai .................. H04W 48/18
370/329
2020/0245235 A1    7/2020 Chun

FOREIGN PATENT DOCUMENTS

WO    WO 2020/036364 A1    2/2020

OTHER PUBLICATIONS

Combined Taiwanese Office Action and Search Report dated Dec. 28, 2021 in Taiwanese Patent Application No. 110126708 (with English translation of categories of cited documents), 6 pages.

* cited by examiner

*Primary Examiner* — Diane D Mizrahi
(74) *Attorney, Agent, or Firm* — Oblon, McClelland, Maier & Neustadt, L.L.P.

(57) ABSTRACT

Aspects of the disclosure provide methods and apparatuses. The method can include receiving, at a user equipment (UE), system information broadcast from one or more base stations which may be shared by one or more PLMNs and/or one or more SNPNs, the system information including an indication of whether accessing an SNPN using home service provider (HSP) subscription of a HSP network is supported. The UE can be configured with subscription information of the HSP network. The subscription information can include the HSP subscription and a selection list that includes one or more candidate networks each represented by an SNPN identifier. The method can further include responsive to the system information, selecting a network from the selection list according to a priority order of the candidate networks, and accessing the network selected from the selection list using the HSP subscription.

20 Claims, 9 Drawing Sheets

Related U.S. Application Data

(60) Provisional application No. 63/062,549, filed on Aug. 7, 2020.

FIG. 9

NETWORK SELECTION FOR SUPPORTED STANDALONE NON-PUBLIC NETWORK (S-SNPN)

CROSS-REFERENCE TO RELATED APPLICATIONS

This present disclosure is a continuation of U.S. application Ser. No. 17/365,018, "Network selection for Supported SNPN" filed on Jul. 1, 2021, which claims the benefit of U.S. Provisional Application No. 63/062,549, filed on Aug. 7, 2020, the entire contents of which are incorporated herein by reference.

TECHNICAL FIELD

The present disclosure relates to wireless communications, and, more particularly, to methods and apparatuses for network selection for supported standalone non-public network (S-SNPN).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless communication systems can employ multiple-access technologies, such as code division multiple access (CDMA), time division multiple access (TDMA), frequency-division multiple access (FDMA), orthogonal frequency-division multiple access (OFDMA), single-carrier frequency-division multiple access (SC-FDMA) and time division synchronous code division multiple access (TD-SCDMA), which are capable of supporting communication with multiple users. The wireless communication systems can provide a variety of telecommunication services.

SUMMARY

Aspects of the disclosure provide a method for selecting a standalone non-public networks (SNPNs) using home service provider (HSP) subscription. For example, the method can include receiving, at a user equipment (UE), system information broadcast from one or more base stations (BSs) that are shared by any combination of one or more public land mobile networks (PLMNs) and/or one or more SNPNs. The system information can include an indication of whether accessing an SNPN using home service provider (HSP) subscription of an HSP network is supported. The HSP network can be a PLMN or an SNPN. The UE can be configured with subscription information of the HSP network provided by an HSP. The subscription information can include the HSP subscription and a selection list that includes one or more candidate networks each represented by an SNPN identifier with different priorities. The method can further include responsive to the system information including the indication of whether accessing an SNPN using the HSP subscription of the HSP network is supported, selecting a network from the selection list according to a priority order of the candidate networks each represented by an SNPN identifier when the UE cannot find the HSP network identifier. In an embodiment, the HSP can be a credentials holder (CH), and the HSP subscription of the HSP network can contain a credential from the CH. In another embodiment, the subscription information of the HSP network contains subscription permanent identifier (SUPI) and credentials for the selected SNPN, and the selected SNPN is provided by a CH. In some embodiments, the selection list is a list of preferred SNPNs with priorities controlled by the HSP. In an embodiment, the system information can further include a list of supported network identifiers, and the method can further include selecting the HSP network to access when the list of supported network identifiers contains the HSP network identifier, and when the list of supported network identifiers does not contain the HSP network identifier of the HSP network, selecting a first SNPN from the selection list to access when an SNPN identifier of the first SNPN is contained in the list of supported network identifiers. In an embodiment, the HSP network can be the selected SNPN, and the HSP network identifier of the HSP network can be the SNPN identifier.

In an embodiment, the method can further include selecting any network when the list of supported network identifiers contains neither the HSP network identifier nor the SNPN identifier in the selection list. As another example, the method can further include switching the UE to operate in a limited service state.

Aspects of the disclosure further provide another method for selecting SNPNs. For example, the method can include receiving, at a UE, system information broadcast from one or more BSs that can be shared by any combination of one or more PLMNs and/or one or more SNPNs. The system information can include a list of supported network identifiers. The UE can be configured with subscription information of an HSP network provided by an HSP. The subscription information can include HSP subscription of the HSP network and a selection list that includes one or more candidate networks each represented by an SNPN identifier with different priorities. The method can further include selecting the HSP network to access when the list of supported network identifiers contains an HSP network identifier of the HSP network. The method can also include when the list of supported network identifiers does not contain the HSP network identifier of the HSP network, selecting a first SNPN from the selection list to access when the SNPN identifier of the first SNPN in the selection list is contained in the list of supported network identifiers.

In an embodiment, the HSP network can be the selected SNPN, and the home SP network identifier of the HSP network can be the SNPN identifier. In another embodiment, the HSP can be a credentials holder (CH), and the HSP subscription of the HSP network can contain a credential from the CH. In some embodiments, the subscription information of the HSP network can contains subscription permanent identifier (SUPI) and credentials for the selected SNPN, and the selected SNPN can be a CH. In various embodiments, the selection list can be a list of preferred SNPNs with priority controlled by the HSP.

In an embodiment, the system information can further include an indication of whether accessing an SNPN using the HSP subscription of the HSP network is supported.

In an embodiment, the method can further include selecting any network when the list of supported network identifiers contains neither the HSP network identifier nor the SNPN identifier in the HSP selection list. As another example, the method can further include switching the UE to operate in a limited service state.

Aspects of the disclosure also provide an apparatus for selecting SNPNs. For example, the apparatus can include receiving circuitry and processing circuitry. The receiving circuitry can be configured to receive system information broadcast from one or more BSs that can be shared by any combination of one or more public land mobile networks (PLMNs) and/or one or more SNPNs. The subscription information can include HSP subscription of the HSP network provided by an HSP and a selection list that includes one or more candidate networks each represented by an SNPN identifier with different priorities. The system information can include an indication of whether accessing an SNPN using the HSP subscription of the HSP network is supported. The processing circuitry can be coupled to the receiving circuitry, and configured to responsive to the system information including the indication of whether accessing the SNPN using the HSP subscription of the HSP network is supported, select a network from the selection list according to a priority order of the candidate networks each represented by an SNPN identifier with different priorities when the HSP network identifier cannot be found. In an embodiment, the HSP can be a credentials holder (CH), and the HSP subscription of the HSP network can contain a credential from the CH In an embodiment, the system information can further include a list of supported network identifiers, and the processing circuitry can be further configured to select the HSP network to access when the list of supported network identifiers contains the HSP network identifier of the HSP network, and when the list of supported network identifiers does not contain the HSP network identifier of the HSP network, select a first SNPN from the selection list to access when an SNPN identifier of the first SNPN in the selection list is contained in the list of supported network identifiers.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

A User Equipment (UE) can move into a Stand-alone Non-Public Network (SNPN) coverage, which can be a first SNPN that has a service level agreement with a home Service Provider (SP) network. The SNPN can broadcast an indication of whether the UE is allowed to access using HSP subscription of the HSP network. The UE can be configured by the HSP network the HSP subscription and a home SP selection list that includes one or more identifiers of candidate networks each represented by an SNPN identifier that includes a Public Land Mobile Network (PLMN) identifier (ID) and a network identifier (NID) with different priorities. In an embodiment, the UE can, responsive to the indication, select a network from the home SP selection list according to a priority order of the candidate networks, and access the network selected from the home SP selection list using the HSP subscription when the UE cannot find an HSP network. In another embodiment, a BS that can be shared by one or more PLMNs or SNPNs can also broadcast a list of supported network identifiers, and the UE can select the HSP network to access when the list of supported network identifiers contains a home SP network identifier of the HSP network, and, when the list of supported network identifiers does not contain the home SP network identifier of the HSP network, select a first SNPN from the home SP selection list to access when an SNPN identifier of the first SNPN is contained in the list of supported network identifiers.

In contrast to a PLMN, that can offer mobile network services to the general public, a Non-Public Network (NPN) (also sometimes called a private network) is a Fifth Generation System (5GS) deployed for non-public use to provide 5G network services to a private entity or organization, such as an enterprise, a campus and a factory. NPN can be desirable for high quality-of-service and security requirements and isolation from other networks. Therefore, unauthorized User Equipments (UEs) that are not associated with the non-public enterprise or factory cannot access the NPN. In some instances, UEs of the enterprise are not allowed to access a network that they are not allowed to access. For example, some enterprise UEs may be restricted to only access the NPN of the enterprise, even if PLMN coverage is available in the same geographic area. In other instances, UEs may be able to access both an NPN and a PLMN where specifically allowed. NPNs can be deployed by considering a variety of factors, such as what frequencies are to be used, who owns and operates the NPNs, and what level of trust exists between these NPN operators and an operator of a PLMN.

An NPN may be deployed as a Public Network Integrated NPN (PNI-NPN) and a Stand-alone Non-Public Network (SNPN). A PNI-NPN is an NPN deployed with the support of a PLMN. An SNPN is operated by an NPN operator and does not rely on network functions provided by a PLMN. SNPN can be applied for licensed New Radio (NR), lightly licensed NR (e.g., NR deployed on top of shared spectrum such as Citizens Broadband Radio Service (CBRS) band), and unlicensed NR (NR-U).

Figure 1:
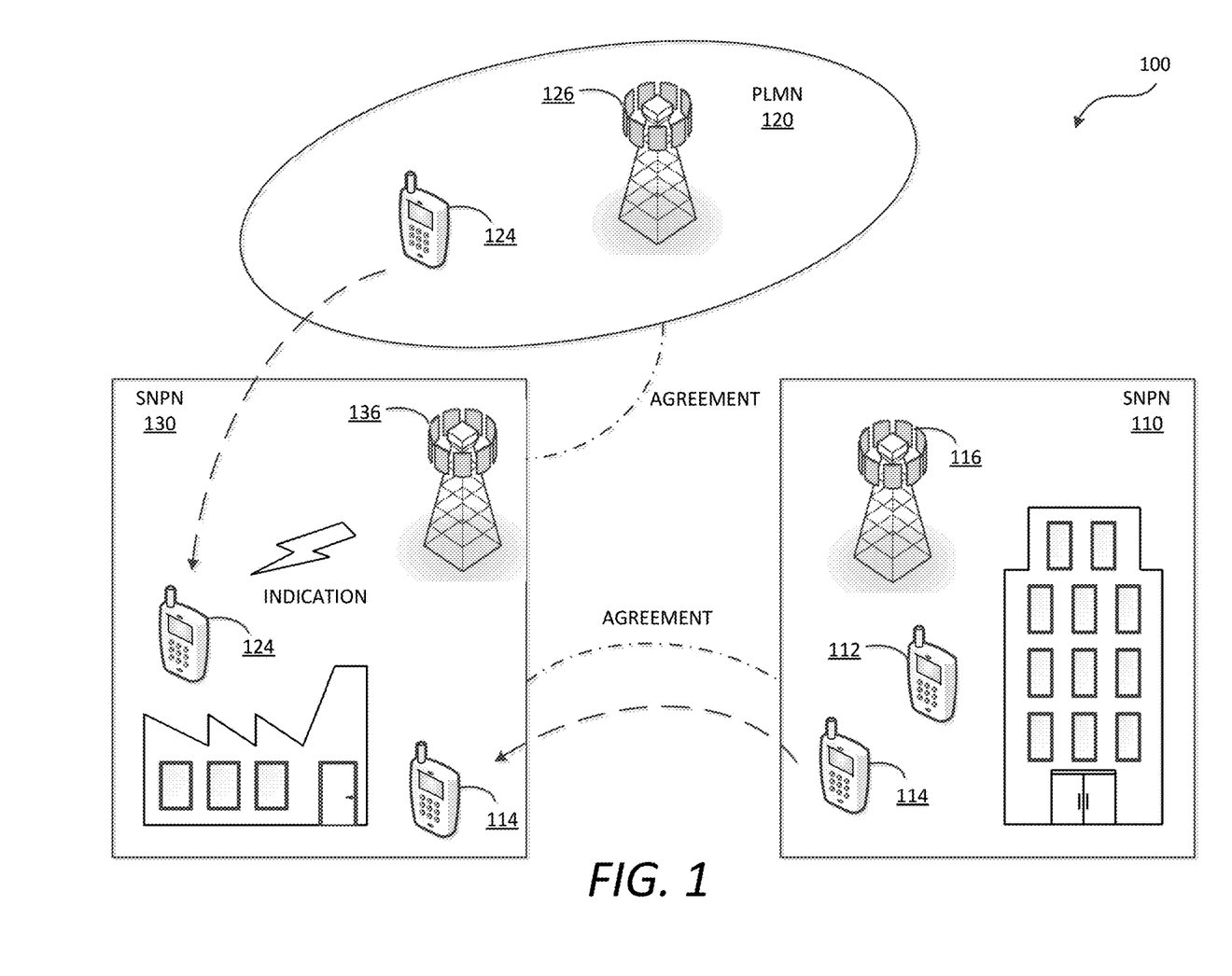
FIG. 1 is a diagram showing an exemplary network deployment scenario according to some embodiments of the disclosure.

FIG. 1 is a diagram showing an exemplary network deployment scenario 100 according to some embodiments of the disclosure. An SNPN 110 is deployed as an independent, standalone network, and has its network functions being located inside the logical perimeter of the defined premises, e.g., an enterprise. The SNPN 110 is thus separate from a public network, for example, a PLMN 120, and can communicate with the PLMN 120 via a firewall only. A UE 112 of the enterprise is not allowed to access the PLMN 120, while a UE 114 of the enterprise is allowed to access the SNPN 110 and the PLMN 120. Therefore, the UE 114 can access the PLMN 120 after moving into the PLMN 120 coverage. The UEs 112 and 114 are SNPN-enabled UEs.

The combination of a PLMN identifier (PLMN ID) and Network ID (NID) can identify an SNPN. The PLMN ID used for SNPNs is not required to be unique. PLMN IDs reserved for use by private networks can be used for non-public networks. A PLMN operator can use its own PLMN IDs for SNPN(s) along with NID(s), but registration in a PLMN and mobility between a PLMN and an SNPN are not supported using an SNPN subscription given that the SNPNs are not relying on network functions provided by the PLMN. Optionally, a human readable network name (HRNN) can also help to identify an SNPN during manual SNPN selection.

The NID shall support a self-assignment mode and a coordinated assignment mode. In the self-assignment mode, NIDs can be chosen individually by SNPNs at deployment time, and may therefore not be unique. In the coordinated assignment mode, an NID can be assigned such that it is globally unique independent of the PLMN ID used, or be assigned such that the combination of the NID and the PLMN ID is globally unique.

Next-Generation Radio Access Network (NG-RAN) nodes, e.g., NG-RANs 116, 126 and 136 shown in FIG. 1, that provide access to SNPNs can broadcast in System Information Block type 1 (SIB1) one or multiple PLMN IDs and a list of NIDs per PLMN ID identifying the non-public networks that NG-RAN provides access to. It is assumed that an NG-RAN node can support broadcasting a total of 12 NIDs. Optionally, the NG-RAN nodes can also broadcast an HRNN per SNPN, which is only used for manual SNPN selection, information to prevent UEs that do not support SNPNs from accessing a cell that only provides access to NPNs, and an indication per SNPN of whether access using credentials from a Credentials Holder (CH) is supported.

As shown in FIG. 1, the NG-RAN 136 of an SNPN 130 can broadcast the indication of whether it allows the UE 114 to access using credentials (or HSP subscription) owned by, for example, the SNPN 110, which can be referred to as an HSP network for the UE 114, as long as the SNPN 130 has a service level agreement with the SNPN 110. The HSP network, which is a network owning a UE's subscription, can also be a PLMN, e.g., the PLMN 120. For example, the UE 124, after moving into the SNPN 130 coverage, can access the SNPN 130 using its HSP subscription owned by the PLMN 120, even if it does not have SNPN 130 subscription, as long as the SNPN 130 also has a service level agreement with the PLMN 120.

An HSP network, e.g., the SNPN 110 and the PLMN 120, which own the UE's HSP subscription, may authenticate and authorize the UEs to access to an SNPN (e.g., the SNPN 130) separate from the HSP network. SNPNs may support UE access using HSP subscription owned by a HSP network separate from this SNPN. For example, the SNPN 130 can support the UE 114 access using the HSP subscription owned by the SNPN 110 and the UE 124 access using the HSP subscription owned by the PLMN 120. An HSP network can use an Authentication Authorization Accounting (AAA) server or Authentication Server Function (AUSF) and Unified Data Management (UDM) for primary authentication and authorization. The AUSF in SNPN may support primary authentication and authorization of UEs that use HSP subscription from an AAA server in an HSP network. If the UDM instructs AUSF that primary authentication by an AAA server in an HSP network is required, the AUSF shall discover and select the AAA server, and then forward Extensible Authentication Protocol (EAP) messages to the AAA server which is acting as the EAP server for the purpose of primary authentication. The SUPI can be used to identify the UE during primary authentication and authorization towards the AAA server. After completing the primary authentication with the AAA server successfully, the Access Mobility Management Function (AMF) and Session Management Function (SMF) shall retrieve the UE subscription data from UDM using SUPI.

The UEs 112, 114 and 124, can be configured, for each subscribed SNPN, with PLMN ID and NID of the SNPN, subscriber identifier (e.g., Subscription Permanent Identifier, SUPI) and HSP subscription. If the UE supports access to an SNPN using HSP subscription from an HSP network, the UE can be further configured with User controlled prioritized list of preferred SNPNs, Credentials Holder controlled prioritized list of preferred SNPNs (or called a home SP selection list), and Credentials Holder controlled prioritized list of Group IDs for Network Selection (GINs). The Credentials Holder controlled prioritized list of preferred SNPNs and GINs can be updated by the HSP network. For example, the SNPN 110 and the PLMN 120 can update their respective home SP selection lists, which can be configured to the UE 114 and 124, respectively.

A subscriber of an SNPN can be identified by a SUPI containing a network-specific identifier that takes the form of a Network Access Identifier (NAI), or identified by a SUPI containing an International Mobile Subscriber Identity (IMSI). In the case of access to an SNPN using HSP subscription owned by an HSP network, the SUPI shall also contain identification for the HSP network. A UE that supports access to an SNPN using HSP subscription from an HSP network and that is equipped with a PLMN subscription may additionally be configured with Users controlled prioritized list of preferred SNPNs, Credentials Holder controlled prioritized list of preferred SNPNs (or called a home SP selection list), and Credentials Holder controlled prioritized list of preferred GINs, for SNPN selection and registration using the PLMN subscription in SNPN access mode. The Credentials Holder controlled prioritized list of preferred SNPNs and GINs can be updated by the HSP network.

An SNPN-enabled UE can be switched to operate in SNPN access mode. Details of activation and deactivation of SNPN access mode can be up to UE implementation. For example, the UEs 114 and 124 can activate and be switched to operate in SNPN access mode and access SNPN 130 using the HSP subscriptions owned by the SNPN 110 and PLMN 120, respectively. As another example, UEs 114 and 124 can also deactivate the SNPN access mode.

When switched or set to operate in SNPN access mode, a UE can only select and register with SNPNs over Uu. If a UE is not set to operate in SNPN access mode, even if it is SNPN-enabled, the UE does not select and register with SNPNs. A UE not set to operate in SNPN access mode can perform PLMN selection procedures. For a UE capable of simultaneously connecting to an SNPN and a PLMN, the setting for operation in SNPN access mode is applied only to the Uu interface for connection to the SNPN.

An SNPN-enabled UE that supports access to an SNPN using HSP subscription (or CH credentials) from an HSP network and that is equipped with HSP subscription needs to first enter SNPN access mode to be able to select SNPNs. Once the UE has entered SNPN access mode, SNPN selection procedures can be performed. Once an SNPN has been selected, the UE can attempt registration in the SNPN using the HSP subscription.

When set to operate in SNPN access mode, a UE does not perform normal PLMN selection procedures. UE operating in SNPN access mode can read the PLMN ID(s) and the list of NIDs per PLMN ID (also referred to as a list of supported network identifiers broadcast by NG-RAN which may be shared by one or more PLMNs or SNPNs), which identifies the NPNs that NG-RAN provides access to, from the broadcast system information and take them into account during network selection.

A UE operating in SNPN access mode can select SNPNs automatically or manually. For automatic network selection, the UE can select and attempt registration on available and allowable SNPNs in the following order: (1) the SNPN that the UE was last registered with (if available); (2) the SNPN that is identified by the PLMN ID and NID for which the UE has SUPI and credentials; and (3) if the UE can support access to an SNPN using credentials from an HSP network, the UE continues by selecting and attempting registration on available and allowable SNPNs which broadcast the indication that access using credentials from an HSP network is supported in the following order: (3-1) SNPNs in the user controlled prioritized list of preferred SNPNs (in priority order); (3-2) SNPNs in the Credentials Holder controlled prioritized list of preferred SNPNs (in priority order); (3-3) SNPNs, which additionally broadcast a GIN contained in the Credentials Holder controlled prioritized list of preferred GINs (in priority order); and (3-4) SNPNs, which additionally broadcast an indication that the SNPN allows registration attempts from UEs that are not explicitly configured to select the SNPN, i.e., the broadcasted NID or GIN is not present in the Credentials Holder controlled prioritized lists of preferred SNPNs/GINs in the UE.

For manual network selection, UEs operating in SNPN access mode can provide to the user the list of SNPNs (each of which can be identified by a PLMN ID and NID) and related HRNN (if available) of the available SNPNs that the UE has respective SUPI and credentials for. If the UEs can support access to an SNPN using credentials from an HSP network, the UE can also present available SNPNs which broadcast the "access using credentials from a Credentials Holder is supported" indication.

When a UE performs Initial Registration to an SNPN, the UE shall indicate the PLMN ID and NID as broadcast by the selected SNPN to NG-RAN. NG-RAN shall inform the AMF of the selected PLMN ID and NID, and the AMF can accept the initial registration if the UE is authorized and can be authenticated. For example, during the network selection procedures a UE can receive and read PLMN IDs and NIDs from SIB1 broadcast by the NG-RAN; then the UE can select an SNPN based on the PLMN IDs, NIDs and HSP subscription automatically, or display HRNN to a user based on the HSP subscription for the user to select an SNPN; the UE can include the PLMN IDs and NIDs in the Radio Resource Control (RRC) as part of Initial Registration; and the RAN can include the PLMN IDs and NIDs in the N2 message toward the AMF.

If a UE performs the registration or service request procedure in an SNPN identified by a PLMN ID and a self-assigned NID and there is no subscription for the UE, the AMF shall reject the UE with an appropriate cause code to temporarily prevent the UE from automatically selecting and registering with the same SNPN. If a UE performs the registration or service request procedure in an SNPN identified by a PLMN ID and a coordinated assigned NID and there is no subscription for the UE, the AMF shall reject the UE with an appropriate cause code to permanently prevent the UE from automatically selecting and registering with the same SNPN.

UEs operating in SNPN access mode can only select cells and networks broadcasting both PLMN ID and NID of the selected SNPN.

An NPN and a PLMN can share NG-RAN. For example, a network sharing architecture supported in Release 17, i.e., 5G Multi-Operator Core Network (5G MOCN), shall support operators' ability to use more than one PLMN ID or combinations of PLMN ID and NID. 5G MOCN can also support sharing scenarios involving NPNs. For example, NG-RAN can be shared by any combination of PLMNs, PNI-NPNs and SNPNs, thus multiple core networks (CNs) being connected to the same NG-RAN. UEs not set to operate in SNPN access mode can decode the broadcast system information and take the information concerning available PLMN IDs into account in PLMN and cell (re-) selection procedures. UEs set to operate in SNPN access mode can decode the broadcast system information and take the information concerning available PLMN IDs and NIDs into account in network and cell (re-) selection procedures.

Figure 2:
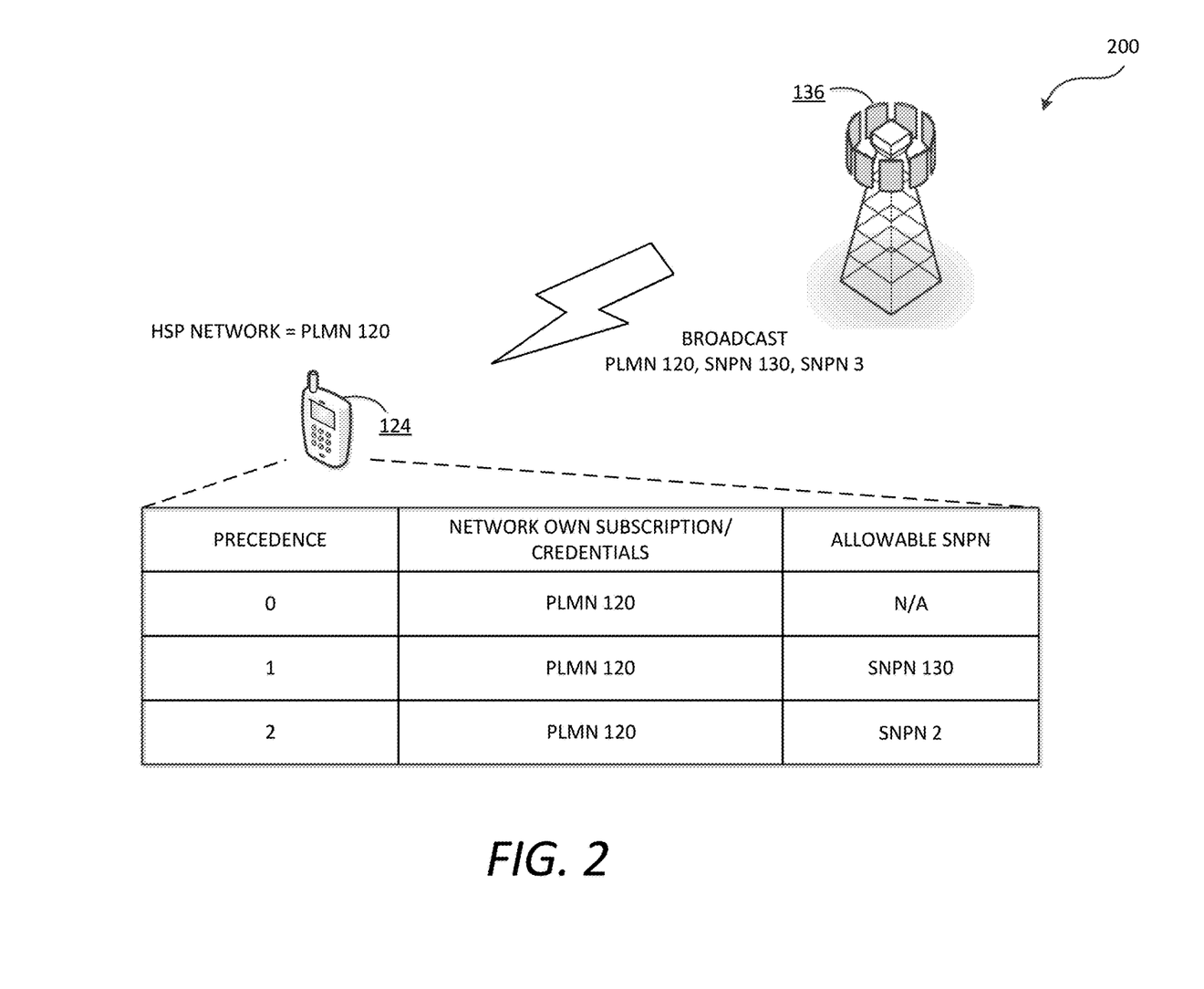
FIG. 2 is a diagram showing a first exemplary scenario that a UE uses HSP subscription of an HSP network to access an SNPN according to some embodiment of the disclosure.

FIG. 2 is a diagram showing a first exemplary scenario 200 that a UE can use HSP subscription owned by an HSP network to access an SNPN, which can be separate from the HSP network and allow the UE to access thereto using the HSP subscription of the HSP network, according to some embodiment of the disclosure. For example, the SNPN 130 can have a service level agreement with the PLMN 120 and allow the UE 124, which moves from the PLMN 120 coverage into the SNPN 130 coverage, to access thereto using the HSP subscription of the PLMN 120. The UE 124 can be configured by the PLMN 120 with its HSP subscription that is owned by the PLMN 120 and a home SP selection list. In an embodiment, the UE can be configured with HSP subscription and the home SP selection list, which includes an SNPN identifier of at least one SNPN. In another embodiment, the home SP selection list can include one or more network candidates each represented by an SNPN identifier that includes a PLMN ID and at least one SNPN ID, e.g., the PLMN ID of the PLMN 120 and the SNPN 130 and SNPN 2. For example, the PLMN ID of the HSP network has the highest priority and the SNPN IDs can have different priorities, and can be listed sequentially in the home SP selection list in accordance with their priorities. In the first exemplary scenario 200, the PLMN 120 can be the HSP network, and the UE 124 can be configured by the PLMN 120 with the HSP subscription of the PLMN 120 and a home SP selection list that includes the PLMN ID of the PLMN 120 and the SNPN identifiers of two SNPNs, e.g., the SNPN 130 and SNPN 2, which have priorities "0," "1" and "2," respectively, and can be listed sequentially in the home SP selection list in accordance with their priorities. The NG-RAN 136 can broadcast system information in SIB1. In the first exemplary scenario 200, the system information can include a list of supported network identifiers, for example, including the PLMN identifier of the PLMN 120 and the SNPN identifiers of the SNPN 130 and SNPN 3. As the PLMN 120 is the HSP network for the UE 124 and has the highest priority "0" and the list of supported network identifiers contains the PLMN identifier of the PLMN 120, the UE 124 shall select the PLMN 120 and attempt to camp on a suitable cell of the PLMN 120, without further considering the SNPN 130, even though the list of supported network identifiers contains the SNPN 130 that matches the SNPN 130 in the configuration.

Figure 3:
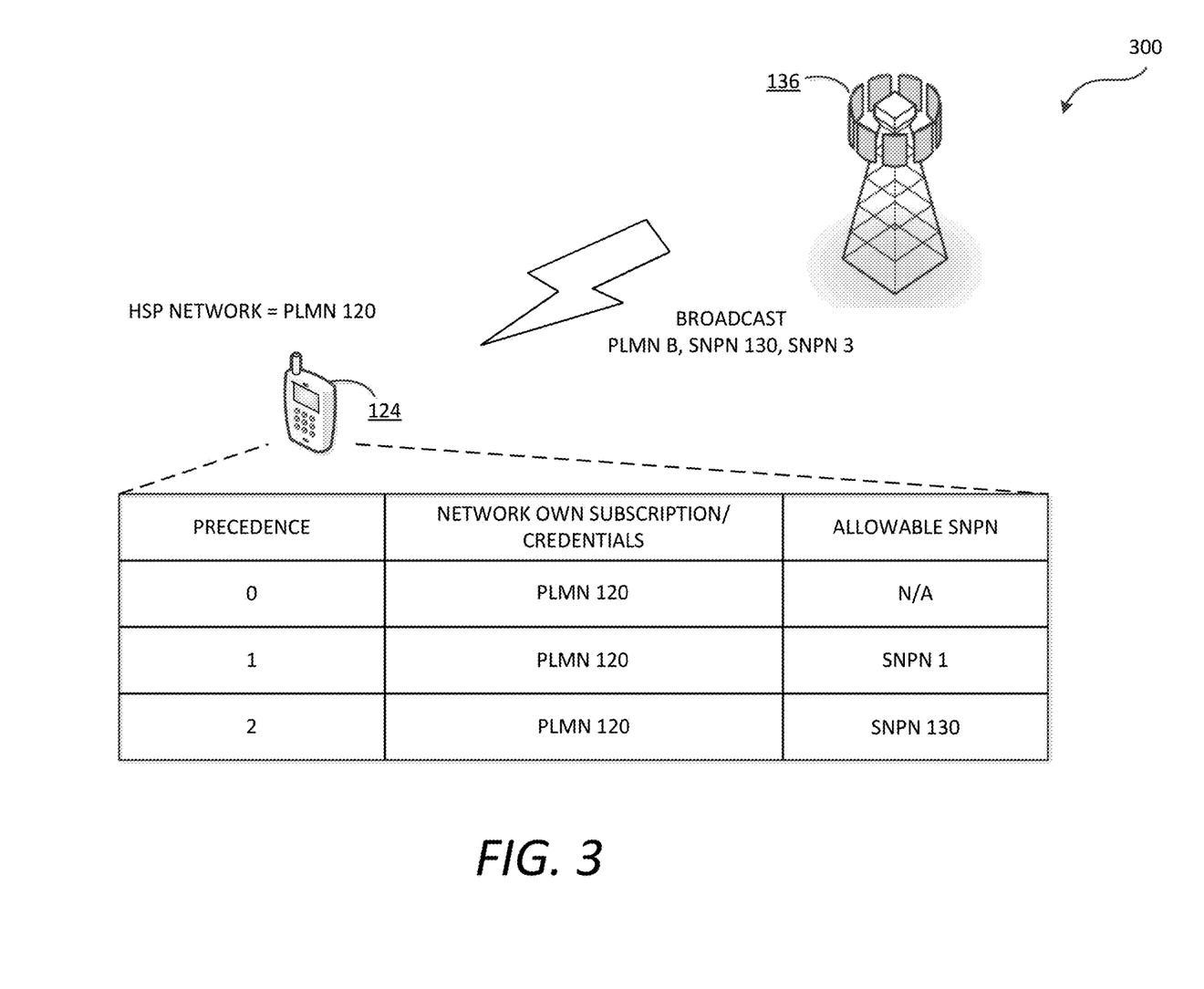
FIG. 3 is a diagram showing a second exemplary scenario that a UE uses HSP subscription of an HSP network to access an SNPN according to some embodiment of the disclosure.

FIG. 3 is a diagram showing a second exemplary scenario 300 that a UE can use HSP subscription owned by an HSP network to access an SNPN according to some embodiment of the disclosure. For example, the SNPN 130 can have a service level agreement with the PLMN 120 and allow the UE 124 to access thereto using the HSP subscription of the PLMN 120. The UE 124 can be configured by the PLMN 120 with its HSP subscription that is owned by the PLMN 120 and a home SP selection list. In the second exemplary scenario 300, the PLMN 120 can be the HSP network, and the UE 124 can be configured by the PLMN 120 with the HSP subscription of the PLMN 120 and a home SP selection list that includes the PLMN ID of the PLMN 120 and the SNPN identifiers of two SNPNs, e.g., SNPN 1 and the SNPN 130, which have priorities "0," "1" and "2," respectively, and can be listed sequentially in the home SP selection list in accordance with their priorities. The NG-RAN 136 can broadcast system information in SIB1. In the second exemplary scenario 300, the system information broadcast by the NG-RAN 136 can include a list of supported network identifiers that contains the PLMN identifier of PLMN B and the SNPN identifiers of the SNPN 130 and SNPN 3. Although the UE 124 cannot read from the list of supported network identifiers the PLMN identifier of the PLMN 120, which is the HSP network for the UE 124, the UE 124 can still compare the list of supported network identifiers with its configuration to find out that the SNPN 130 in the list of supported network identifiers matches the SNPN 130 in the configuration, and use the HSP subscription of the PLMN 120 to access the SNPN 130, even though the UE 124 does not have the SNPN 130 subscription and the SNPN 130 has a lower priority than the SNPN 1. Before using the HSP subscription of the PLMN 120 to access the SNPN 130, the UE 124 has to enter SNPN access mode first.

Figure 4:
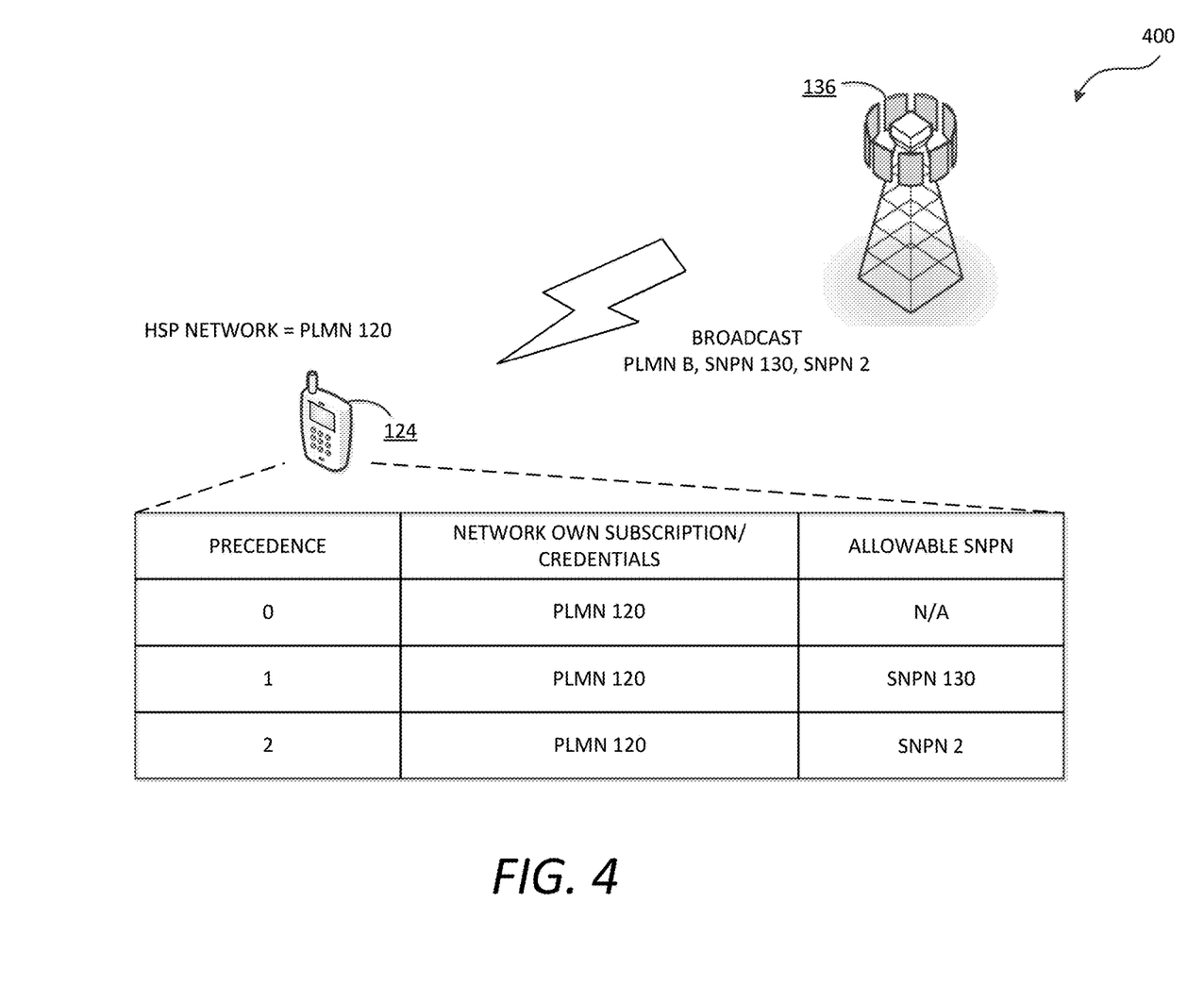
FIG. 4 is a diagram showing a third exemplary scenario that a UE uses HSP subscription of an HSP network to access an SNPN according to some embodiment of the disclosure.

FIG. 4 is a diagram showing a third exemplary scenario 400 that a UE can use HSP subscription owned by an HSP network to access an SNPN according to some embodiment of the disclosure. For example, the SNPN 130 can have a service level agreement with the PLMN 120 and allow the UE 124 to access thereto using the HSP subscription of the PLMN 120. The UE 124 can be configured by the PLMN 120 with its HSP subscription that is owned by the PLMN 120 and a home SP selection list. In the third exemplary scenario 400, the PLMN 120 can be the HSP network, and the UE 124 can be configured by the PLMN 120 with the HSP subscription of the PLMN 120 and a home SP selection list that includes the PLMN ID of the PLMN 120 and the SNPN identifiers of two SNPNs, e.g., the SNPN 130 and SNPN 2, which have priorities "0," "1" and "2," respectively, and can be listed sequentially in the home SP selection list in accordance with their priorities. The NG-RAN 136 can broadcast system information in SIB1. In the third exemplary scenario 400, the system information broadcast by the NG-RAN 136 can include a list of supported network identifiers that contains the PLMN identifier of PLMN B and the SNPN identifiers of the SNPN 130 and SNPN 2. Although the UE 124 cannot read from the list of supported network identifiers of the system information the PLMN ID of the PLMN 120, which is the HSP network for the UE 124, the UE 124 can still compare the list of supported network identifiers with its configuration to find out that there are two SNPNs, i.e., the SNPN 130 and SNPN 2, in the list of supported network identifiers that match the SNPN 130 and SNPN 2 in the configuration, and use the HSP subscription of the PLMN 120 to access the SNPN 130 or SNPN 2. As the SNPN 130 has a higher priority than SNPN 2, or the SNPN 130 is listed before SNPN 2 in the home SP selection list, the UE 124 shall use the HSP subscription of the PLMN 120 to access the SNPN 130. Before using the HSP subscription of the PLMN 120 to access the SNPN 130, the UE 114 has to enter SNPN access mode first.

Figure 5:
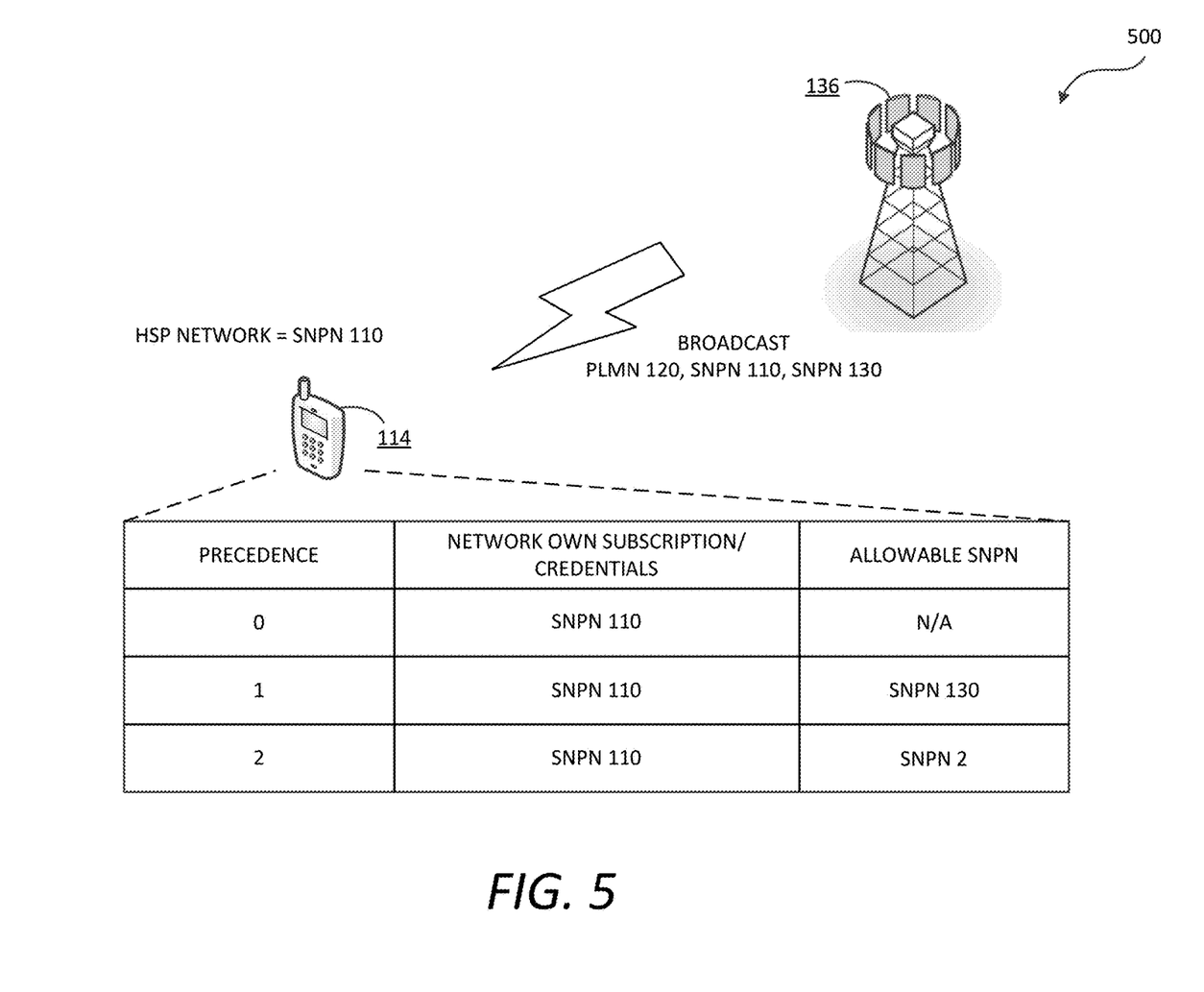
FIG. 5 is a diagram showing a fourth exemplary scenario that a UE uses HSP subscription of an HSP network to access an SNPN according to some embodiment of the disclosure.

FIG. 5 is a diagram showing a fourth exemplary scenario 500 that a UE can use HSP subscription owned by an HSP network to access an SNPN according to some embodiment of the disclosure. For example, the SNPN 130 can have a service level agreement with the SNPN 110 and allow the UE 114, which moves from the SNPN 110 coverage into the SNPN 130 coverage, to access thereto using the HSP subscription of the SNPN 110. The UE 114 can be configured by the SNPN 110 with its HSP subscription that is owned by the SNPN 110 and a home SP selection list. In an embodiment, the home SP selection list can include a home SP network identifier of the HSP network (i.e., the SNPN ID of the SNPN 110) and an SNPN identifier of at least one SNPN. In another embodiment, the home SP selection list can include the home SP network identifier of the HSP network and SNPN identifiers of a plurality of SNPNs that have different priorities. For example, the SNPN 110 and the plurality of SNPNs can be listed sequentially in the home SP selection list in accordance with their priorities. In the fourth exemplary scenario 500, the SNPN 110 is the HSP network, and the UE 114 is configured by the SNPN 110 with the HSP subscription of the SNPN 110 and a home SP selection list that includes the SNPN ID of the SNPN 110 and the SNPN identifiers of two SNPNs, e.g., SNPN 130 and SNPN 2, which have priorities "0," "1" and "2," respectively, and can be listed sequentially in the home SP selection list in accordance with their priorities. The NG-RAN 136 can broadcast system information in SIB1. In the fourth exemplary scenario 500, the system information can include a list of supported network identifiers that contains the PLMN identifier of the PLMN 120, the SNPN identifier of the SNPN 110 and the SNPN identifier of the SNPN 130. As the SNPN 110 is the HSP network for the UE 114 and has the highest priority "0" and the list of supported network identifiers of the system information contains the SNPN identifier of the SNPN 110, the UE 114 shall select the SNPN 110 and attempt to camp on a suitable cell of the SNPN 110, without further considering the SNPN 130, even though the list of supported network identifiers contains the SNPN 130 that matches the SNPN 130 in the configuration.

Figure 6:
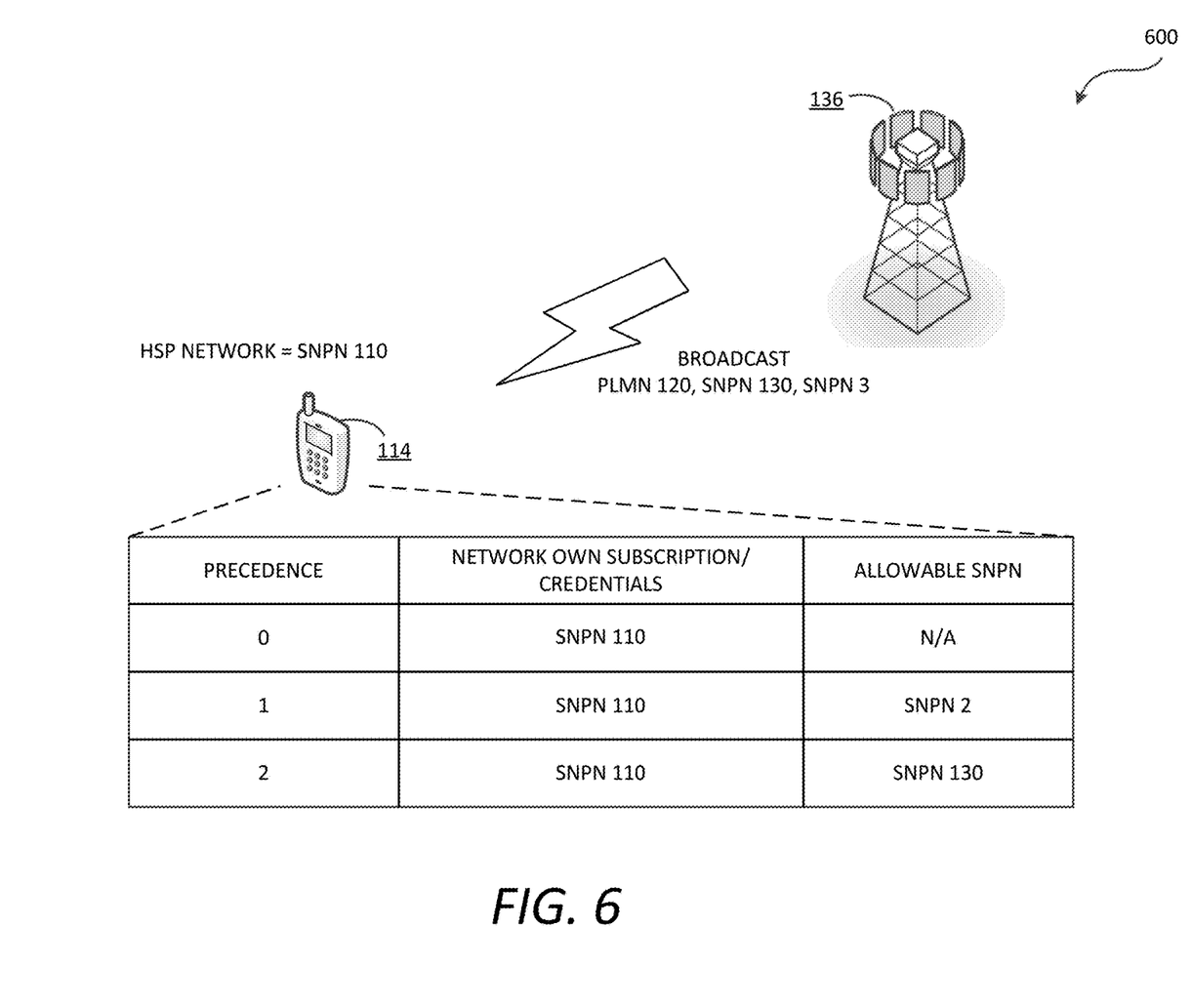
FIG. 6 is a diagram showing a fifth exemplary scenario that a UE uses HSP subscription of an HSP network to access an SNPN according to some embodiment of the disclosure.

FIG. 6 is a diagram showing a fifth exemplary scenario 600 that a UE can use HSP subscription owned by an HSP network to access an SNPN according to some embodiment of the disclosure. For example, the SNPN 130 can have a service level agreement with the SNPN 110 and allow the UE 114 to access thereto using the HSP subscription of the SNPN 110. The UE 114 can be configured by the SNPN 110 with its HSP subscription that is owned by the SNPN 110 and a home SP selection list. In the fifth exemplary scenario 600, the SNPN 110 can be the HSP network, and the UE 114 can be configured by the SNPN 110 with the HSP subscription of the SNPN 110 and a home SP selection list that includes the SNPN ID of the SNPN 110 and the SNPN identifiers of two SNPNs, e.g., SNPN 2 and the SNPN 130, which have priorities "0," "1" and "2," respectively, and can be listed sequentially in the home SP selection list in accordance with their priorities. The NG-RAN 136 can broadcast system information in SIB1. In the fifth exemplary scenario 600, the system information broadcast by the NG-RAN 136 can include a list of supported network identifiers that contains the PLMN identifier of the PLMN 120 and the SNPN identifiers of the SNPN 130 and SNPN 3. Although the UE 114 cannot read from the list of supported identifiers of the system information the SNPN identifier of the SNPN 110, which is the HSP network for the UE 114, the UE 114 can still compare the list of supported network identifiers with its configuration to find out that the SNPN 130 in the list of supported network identifiers matches the SNPN 130 in the configuration, and use the HSP subscription of the SNPN 110 to access the SNPN 130, even though the UE 114 does not have the SNPN 130 subscription and the SNPN 130 has a lower priority than the SNPN 2. Before using the HSP subscription of the SNPN 110 to access the SNPN 130, the UE 114 has to enter SNPN access mode first.

Figure 7:
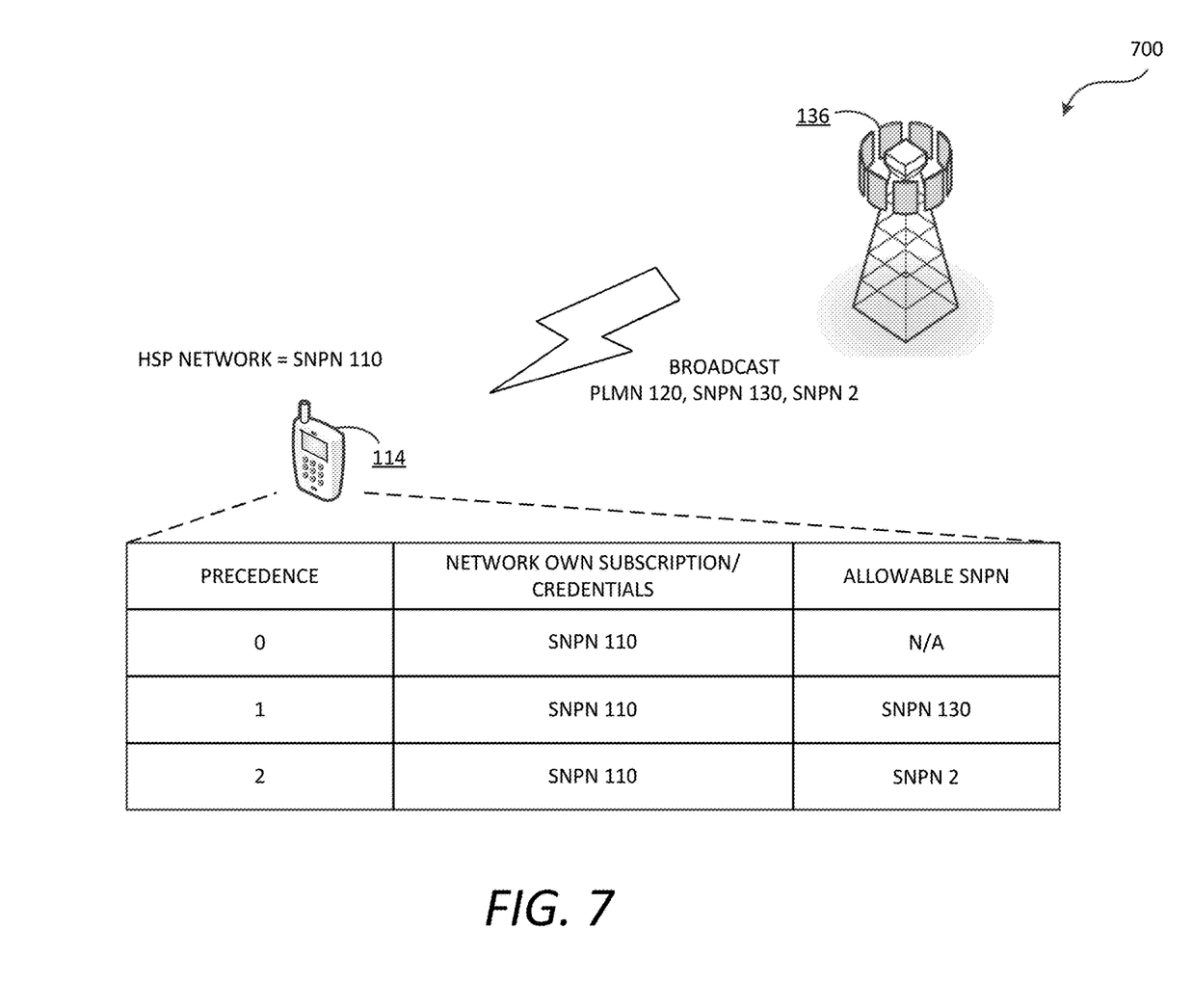
FIG. 7 is a diagram showing a sixth exemplary scenario that a UE uses HSP subscription of an HSP network to access an SNPN according to some embodiment of the disclosure.

FIG. 7 is a diagram showing a sixth exemplary scenario 700 that a UE can use HSP subscription owned by an HSP network to access an SNPN according to some embodiment of the disclosure. For example, the SNPN 130 can have a service level agreement with the SNPN 110 and allow the UE 114 to access thereto using the HSP subscription of the SNPN 110. The UE 114 can be configured by the SNPN 110 with its HSP subscription that is owned by the SNPN 110 and a home SP selection list. In the sixth exemplary scenario 700, the SNPN 110 can be the HSP network, and the UE 114 can be configured by the SNPN 110 with the HSP subscription of the SNPN 120 and a home SP selection list that includes the SNPN identifier of the SNPN 110 and the SNPN identifiers of two SNPNs, e.g., the SNPN 130 and SNPN 2, which have priorities "0," "1" and "2," respectively, and can be listed sequentially in the home SP selection list in accordance with their priorities. The NG-RAN 136 can broadcast system information in SIB1. In the sixth exemplary scenario 700, the system information broadcast by the NG-RAN 136 can include a list of supported network identifiers that contains the PLMN identifier of the PLMN 120 and the SNPN identifiers of the SNPN 130 and SNPN 2. Although the UE 114 cannot read from the list of supported network identifiers of the system information the SNPN identifier of the SNPN 110, which is the HSP network for the UE 114, the UE 114 can still compare the list of supported network identifiers with its configuration to find out that there are two SNPNs, i.e., the SNPN 130 and SNPN 2, in the list of supported network identifiers that match the SNPN 130 and SNPN 2 in the configuration, and use the HSP subscription of the SNPN 110 to access the SNPN 130 or SNPN 2. As the SNPN 130 has a higher priority than SNPN 2, or the SNPN 130 is listed before SNPN 2 in the home SP selection list, the UE 114 shall use the HSP subscription of the SNPN 110 to access the SNPN 130. Before using the HSP subscription of the SNPN 110 to access the SNPN 130, the UE 114 has to enter SNPN access mode first.

In the first to sixth exemplary scenarios 200 to 700, if the UE 124/114, which moves into the SNPN 130 coverage, cannot read from the list of supported network identifiers the home SP network identifier of the HSP network (e.g., the PLMN ID of the PLMN 120 and the SNPN ID of the SNPN 110) or any one of the SNPN identifiers of the SNPNs listed in the home SP selection list, the UE 124/114 can be allowed to select any network and attempt to camp on an acceptable cell of the network. After registration with the acceptable cell, the UE 124/114 can operate in a limited service state. For example, the UE 124/114 operating in the limited service state can make an emergency call.

Figure 8:
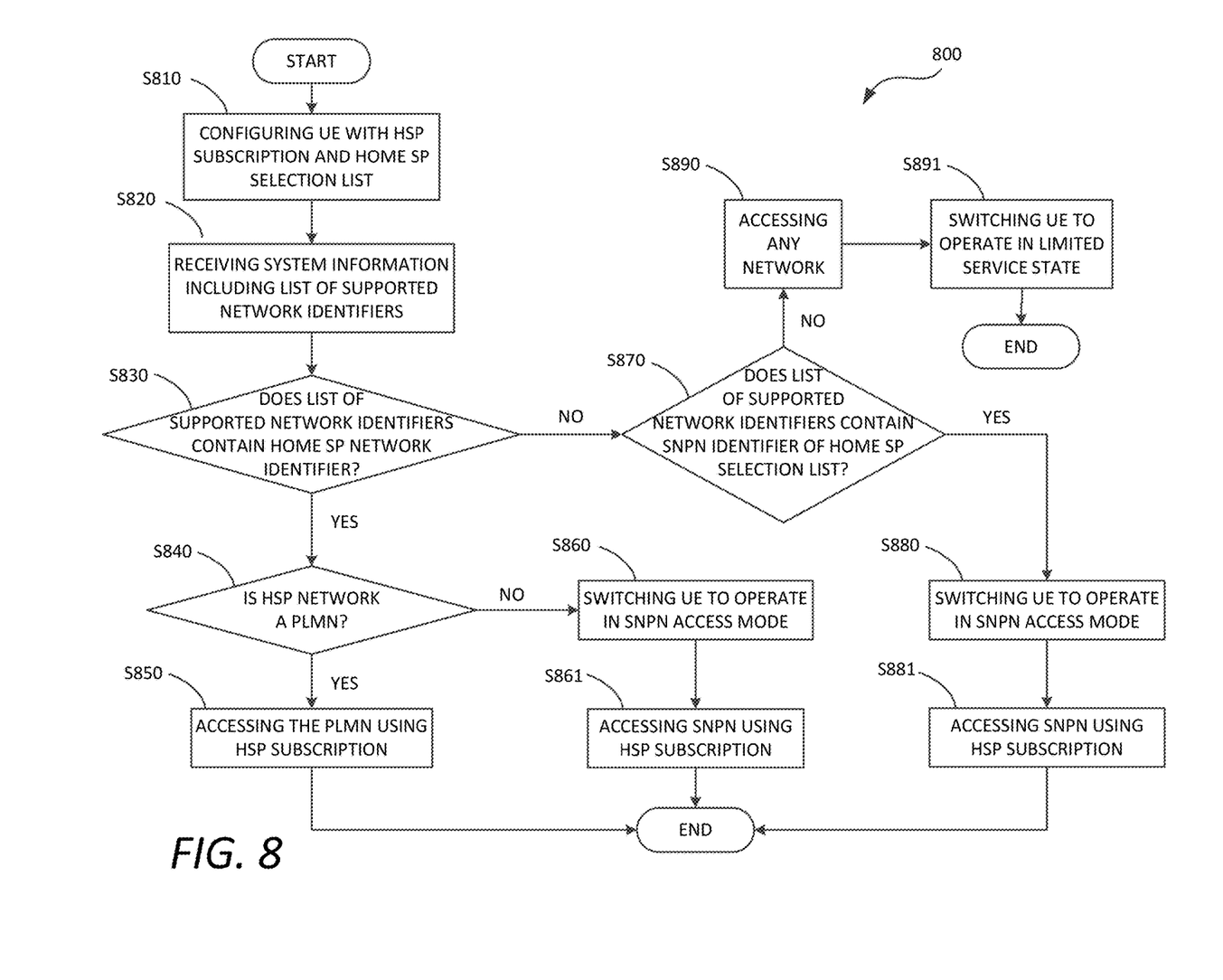
FIG. 8 is a flow chart illustrating an exemplary method for selecting SNPNs according to some embodiment of the disclosure.

FIG. 8 is a flow chart illustrating an exemplary method 800 for selecting SNPNs according to some embodiment of the disclosure. The exemplary method 800 can be applied to the first to sixth exemplary scenarios 200 to 700. In various embodiments, some of the steps of the method 800 shown can be performed concurrently or in a different order than shown, can be substituted by other method steps, or can be omitted. Additional method steps can also be performed as desired. Aspects of the method 800 can be implemented by a wireless device, such as the UEs 114 and 124 illustrated in and described with respect to the preceding figures.

At step S810, a UE can be configured by an HSP network with HSP subscription that is owned by the HSP network and a home SP selection list. For example, the HSP network can be a PLMN or an SNPN. In an embodiment, the home SP selection list can include the home SP network identifier of the HSP network and an SNPN identifier of at least one SNPN. The SNPN can allow the UE to access thereto using the HSP subscription of the HSP network. For example, the UE 124 can be configured by the PLMN 120 with its HSP subscription owned by the PLMN 120 and the home SP selection list, and use the HSP subscription of the PLMN 120 to access the SNPN listed in the home SP selection list, as disclosed in the first to third exemplary scenarios 200 to 400 of FIGS. 2 to 4. As another example, the UE 114 can be configured by the SNPN 110 with its HSP subscription owned by the SNPN 110 and the home SP selection list, and use the HSP subscription of the SNPN 110 to access the SNPN listed in the home SP selection list, as disclosed in the fourth to sixth exemplary scenarios 500 to 700 of FIGS. 5 to 7.

At step S820, an SNPN can broadcast system information in SIB1. In an embodiment, the system information can include a home SP-supported indication that the SNPN supports using the HSP subscription to access the SNPN. In another embodiment, the system information can further include a list of supported network identifiers. For example, the NG-RAN 136 can broadcast the list of supported network identifiers and the indication that the SNPN 130 supports using the HSP subscription to access the SNPN 130 associated with the list of supported network identifiers.

At step S830, the UE can compare the list of supported network identifiers with the home SP selection list and determine whether the list of supported network identifiers contains the home SP network identifier. If the list of supported network identifiers contains the home SP network identifier, as disclosed in the first and fourth exemplary scenarios 200 and 500 of FIGS. 2 and 5, the method 800 proceeds to step S840; otherwise the method 800 proceeds to step S870.

At step S840, it is determined that the list of supported network identifiers contains the home SP network identifier, and is further determined whether the HSP network is a PLMN. If the HSP network is a PLMN, as disclosed in the first exemplary scenario 200 of FIG. 2, the method 800 proceeds to S850; otherwise, as disclosed in the fourth exemplary scenario 500 of FIG. 5, the method 800 proceeds to S860.

At step S850, it is determined that the HSP network is a PLMN, and the UE can select the home PLMN using the HSP subscription and attempt to camp on a suitable cell of the PLMN. For example, the UE 124 can select the PLMN 120 using the HSP subscription of the PLMN 120.

At step S860, it is determined that the HSP network is an SNPN, and UE shall be switched to operate in SNPN access mode in order to access the SNPN.

At step S861, the UE operating in SNPN access mode can now access the home SNPN using the HSP subscription and attempt to camp on a suitable cell of the SNPN. For example, the UE 114 can access the SNPN 110 using the HSP subscription of the SNPN 110.

At step S870, it is determined that the list of supported network identifiers does not contain the home SP network identifier, and is further determined whether the list of supported network identifiers contains the SNPN identifiers of the home SP selection list. If the list of supported network identifiers contains the SNPN identifiers of the home SP selection list, as disclosed in the second, third, fifth and sixth exemplary scenarios 300, 400, 600 and 700 of FIGS. 3, 4, 6 and 7, the method 800 proceeds to step S880; otherwise the method 800 proceeds to step S890.

At step S880, it is determined that the list of supported network identifiers, though containing no home SP network identifier, contains the SNPN identifiers of the home SP selection list, and UE shall be switched to operate in SNPN access mode in order to access the SNPN.

At step S881, the UE can select the SNPN using the HSP subscription and attempt to camp on a suitable cell of the SNPN. For example, the UE 114/124 can access the SNPN 130 using the HSP subscription of the SNPN 110.

At step S890, it is determined that the list of supported network identifiers contains neither the home SP network identifier nor the SNPN identifiers contained in the home SP selection list, the UE can be allowed to select any network that is not listed in the home SP selection list. For example, the network can be a PLMN. As another example, the network can be an SNPN.

At step S890, the UE, after selecting the PLMN or the SNPN that is not listed in the home SP selection list, shall be switched to operate in a limited service state.

Figure 9:
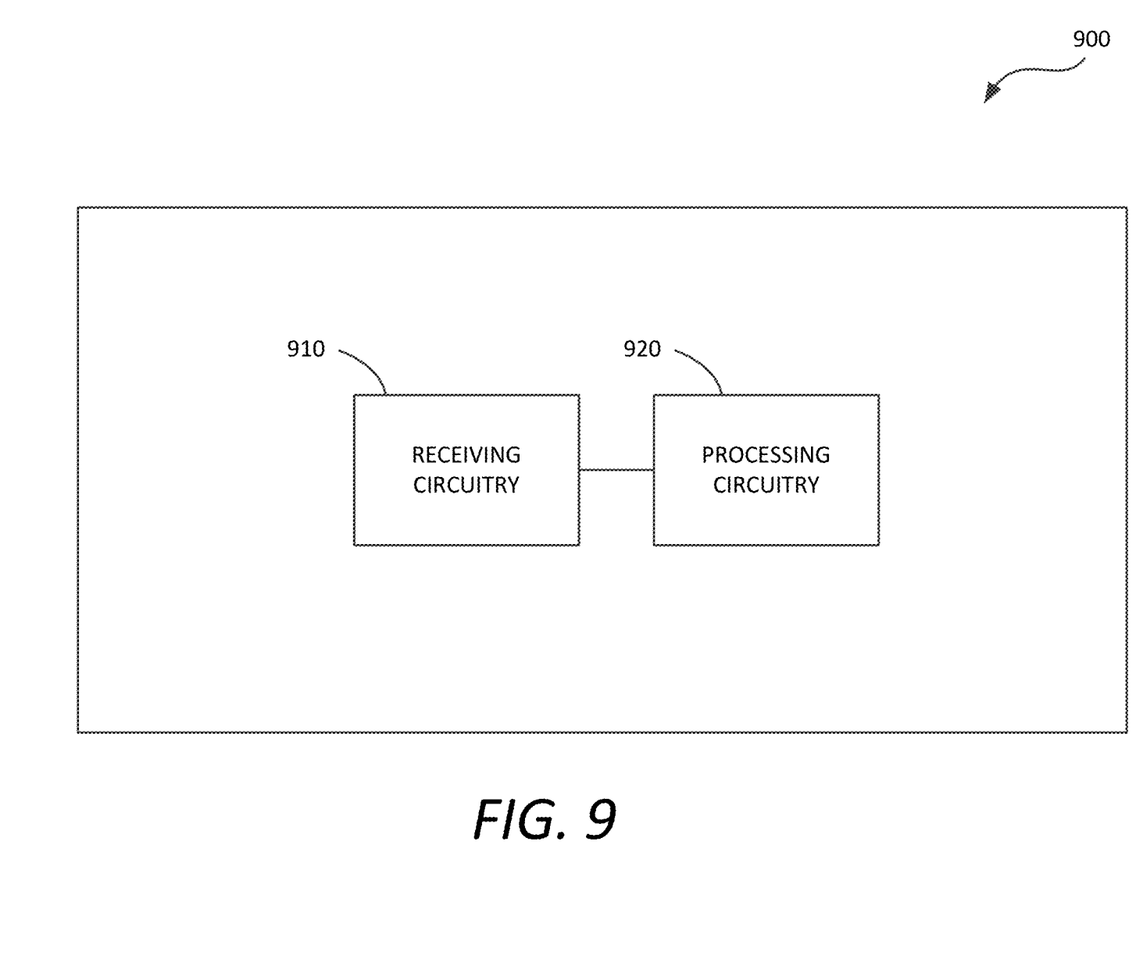
FIG. 9 is a functional block diagram of an exemplary apparatus that is capable of selecting SNPNs according to some embodiments of the disclosure.

FIG. 9 is a functional block diagram of an exemplary apparatus 900 that is capable of selecting SNPNs according to some embodiments of the disclosure. The apparatus 900 can be used to perform the method 800. For example, the apparatus 900 can include receiving circuitry 910 and processing circuitry 920. The receiving circuitry 910 can be configured to receive system information broadcast from a base station (BS) that can be shared by one or more PLMNs and SNPNs and subscription information of an HSP network. In an embodiment, the receiving circuitry 910 of the apparatus 900 can receive the system information broadcast from a BS of the SNPN 130. For example, the subscription information can include HSP subscription of the HSP network and a home SP selection list that includes one or more candidate networks each represented by an SNPN identifier including a PLMN identifier and at least one NID with different priorities. As another example, the system information can include an indication of whether accessing an SNPN using the HSP subscription of the HSP network is supported. The processing circuitry 920 can be coupled to the receiving circuitry 910 and configured to, responsive to the system information including the indication of whether accessing an SNPN using the HSP subscription of the HSP network is supported, select a network from the home SP selection list according to a priority order of the candidate networks, and access the network selected from the home SP selection list using the HSP subscription included in the subscription information of the HSP network.

In an embodiment, the system information can further include a list of supported network identifiers, and the processing circuitry 920 can be further configured to select the HSP network from the home SP selection list to access when the list of supported network identifiers contains a home SP network identifier of the HSP network. In another embodiment, when the list of supported network identifiers does not contain the home SP network identifier of the HSP network, the processing circuitry 920 can be further configured to select a first SNPN from the home SP selection list to access when an SNPN identifier of the first SNPN is contained in the list of supported network identifiers. For example, the first SNPN can be different from the SNPN. As another embodiment, the first SNPN can be the same as the SNPN.

In various embodiments according to the disclosure, the receiving circuitry 910 and the processing circuitry 920 can include circuitry configured to perform the functions and processes described herein in combination with software or without software. In various examples, the processing circuitry 920 can be a digital signal processor (DSP), an application specific integrated circuit (ASIC), programmable logic devices (PLDs), field programmable gate arrays (FPGAs), digitally enhanced circuits, or comparable device or a combination thereof. In some other embodiments according to the disclosure, the processing circuitry 920 can be a central processing unit (CPU) configured to execute program instructions to perform various functions and processes described herein.

The apparatus 900 can optionally include other components, such as input and output devices, additional or signal processing circuitry, and the like. Accordingly, the apparatus 900 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving, at a user equipment (UE), system information broadcast from one or more base stations (BSs), each of the BSs being shared by any combination of one or more public land mobile networks (PLMNs) and/or one or more standalone non-public networks (SNPNs), the system information including an indication of whether accessing an SNPN using home service provider (HSP) subscription of an HSP network provided by an HSP is supported, the UE being configured with subscription information of the HSP network and a selection list that includes one or more candidate networks each represented by an SNPN identifier with different priorities; and
responsive to the system information including the indication of whether accessing an SNPN using the HSP subscription of the HSP network is supported, selecting a network from the selection list according to a priority order of the candidate networks each represented by an SNPN identifier with different priorities when the UE cannot find the HSP network.

2. The method of claim 1, wherein the HSP is a credentials holder (CH), and the HSP subscription of the HSP network contains a credential from the CH.

3. The method of claim 1, wherein the subscription information of the HSP network contains subscription permanent identifier (SUPI) and credentials for accessing the selected SNPN.

4. The method of claim 1, wherein the selection list is a list of preferred SNPNs with priorities controlled by the HSP.

5. The method of claim 1, wherein the system information further includes a list of supported network identifiers, and the method further comprises:
selecting the HSP network to access when the list of supported network identifiers contains an HSP network identifier of the HSP network; and
when the list of supported SNPN identifiers does not contain the HSP network identifier of the HSP network, selecting a first SNPN from the selection list to access when an SNPN identifier of the first SNPN is contained in the list of supported SNPN identifiers.

6. The method of claim 5, wherein the HSP network is the selected SNPN, and the HSP network identifier of the HSP network is a SNPN identifier.

7. The method of claim 5, further comprising:
selecting any network when the list of supported network identifiers contains neither the home SP network identifier nor the SNPN identifier in the selection list.

8. The method of claim 7, further comprising:
switching the UE to operate in a limited service state.

9. A method, comprising:
receiving, at a user equipment (UE), system information broadcast from one or more base stations (BSs), each of the BSs being shared by any combination of one or more public land mobile networks (PLMNs) and/or one or more standalone non-public networks (SNPNs), the system information including a list of supported network identifiers, the UE being configured with subscription information of a home service provider (HSP) network provided by an HSP, the subscription information including HSP subscription of the HSP network and a selection list that includes one or more candidate networks each represented by an SNPN identifier with different priorities;
selecting the HSP network to access when the list of supported network identifiers contains a home SP network identifier of the HSP network; and
when the list of supported network identifiers does not contain the HSP network identifier of the HSP network, selecting a first SNPN from the selection list to access when an SNPN identifier of the first SNPN is contained in the list of supported network identifiers.

10. The method of claim 9, wherein the HSP network is the selected SNPN, and the home SP network identifier of the HSP network is a SNPN identifier.

11. The method of claim 9, wherein the HSP is a credentials holder (CH), and the HSP subscription of the HSP network contains a credential from the CH.

12. The method of claim 9, wherein the subscription information of the HSP network contains subscription permanent identifier (SUPI) and credentials for the selected SNPN, and the selected SNPN is a CH.

13. The method of claim 9, wherein the selection list is a list of preferred SNPNs with priority controlled by the HSP.

14. The method of claim 9, wherein the system information further includes an indication of whether accessing an SNPN using the HSP subscription of the HSP network is supported.

15. The method of claim 9, further comprising:
selecting any network when the list of supported network identifiers contains neither the home SP network identifier nor the SNPN identifier.

16. The method of claim 15, further comprising:
switching the UE to operate in a limited service state.

17. An apparatus, comprising
receiving circuitry configured to receive system information broadcast from one or more base stations (BS) that are shared by any combination of one or more public land mobile networks (PLMNs) and/or one or more standalone non-public networks (SNPNs) and subscription information of a home service provider (HSP) network provided by an HSP, the subscription information including HSP subscription of the HSP network and a selection list that includes one or more candidate networks each represented an SNPN identifier with different priorities, the system information including an indication of whether accessing an SNPN using the HSP subscription of the HSP network is supported; and
processing circuitry coupled to the receiving circuitry, the processing circuitry configured to responsive to the system information including the indication of whether accessing an SNPN using the HSP subscription of the HSP network is supported, select a network from the selection list according to a priority order of the candidate networks each represented by an SNPN identifier with different priorities when the UE cannot find the HSP network.

18. The apparatus of claim 17, wherein the HSP is a credentials holder (CH), and the HSP subscription of the HSP network contains a credential from the CH.

19. The apparatus of claim 17, wherein the system information further includes a list of supported network identifiers, and the processing circuitry is further configured to:
select the HSP network to access when the list of supported network identifiers contains an HSP network identifier of the HSP network; and when the list of supported network identifiers does not contain the home SP network identifier of the HSP network, select a first SNPN from the selection list to access when an SNPN identifier of the first SNPN is contained in the list of supported network identifiers.

20. The apparatus of claim 17, wherein the processing circuitry is further configured to switch the apparatus to operate in an SNPN access mode.

\* \* \* \* \*